Patented Sept. 4, 1934

1,972,527

UNITED STATES PATENT OFFICE 1,972,527

PRODUCTION OF PREFORMED PLASTER SLABS, SHEETS, AND OTHER ARTICLES

Victor Lefebure, Westminster, London, England

No Drawing. Application December 18, 1933, Serial No. 703,028. In Great Britain December 19, 1932

9 Claims. (Cl. 154—2)

This invention relates to the production of preformed plaster slabs, sheets and other articles.

At present such articles are made by casting a more or less fluid plaster mix in a mould, in which the mix is confined until it has set or hardened sufficiently to retain its shape when unsupported. This process, which is discontinuous, has been modified to a certain extent in the manufacture of so-called plaster board, i. e. a laminated slab or sheet comprising an inner layer of plaster bounded by sheets of pulp board or cardboard, in which a plaster of Paris mix is applied to a moving band of pulp board. The mix is prepared in the form of a thin cream or slurry so as to extend the time of set to say 10 to 15 minutes and thereby allow sufficient time for mixing and feeding.

The processes described in the preceding paragraph are cumbersome, and one object of the present invention is to overcome this drawback and to provide an improved continuous process for the production of preformed plaster slabs, sheets, and other articles, especially plaster board. Another object of the invention is to provide a plaster board having improved mechanical properties.

I have discovered that plasters of the accelerated anhydrite type, when mixed with a limited amount of water, i. e. from about 15 to 20 per cent. by weight of the dry powder, give putty- or dough-like masses which for a short initial period behave like true plastics. These putty- or dough-like masses gradually harden or set to a good, hard plaster, the setting times being shorter the less the amount of water in the mix, as is illustrated in Table 1 below. It should be noted that quantities of water equal to 15 to 20 per cent. calculated on the weight of the dry powder are sufficient to satisfy the chemical requirements of the setting process, inasmuch as set anhydrite plaster, after removal of surplus water, is generally found to contain about 14 per cent. of water.

By plasters of the accelerated anhydrite type I mean plasters the setting properties of which are essentially due to the hydration of anhydrous calcium sulphate under the influence of small amounts of suitable accelerators such as alkali metal salts and certain metal sulphates, especially the accelerators mentioned in my British Patent 236,695 (U. S. 1,879,877). As there described, a mixture of zinc sulphate and potassium sulphate is used; the amount added being about 3 per cent of the anhydrite. The two salts can be used in a weight ratio of 3:2; approximately in equimolecular proportions. The speed of set is governed by the nature and amount of accelerator employed and by the degree of fineness of the plaster. The plaster which I prefer to employ for the purpose of the invention is mineral anhydrite, ground so that at least 80 per cent. passes a 180-mesh sieve, together with small amounts of suitable accelerators.

Table 1

(Material used:—Anhydrite ground so that 80 per cent. passes a 180-mesh sieve, mixed with about 1.6 per cent of a mixture of potassium sulphate and zinc sulphate.)

| Percentage of water used, calculated on weight of dry powder | Time in minutes required to reach a firm set |
|---|---|
| 15 | 10 |
| 17.5 | 21 |
| 20 | 34 |
| 22.5 | 35 |
| 25 | 50 |
| 27.5 | 59 |
| 30 | 77 |

The last three rows of figures in the above table correspond to mixes which would normally be used for trowelling purposes, and are given for the purpose of comparison.

It should be noted that merely by restricting the quantity of water in the mix, the setting time is shortened to about 15 minutes, which is about the correct time for economic operation of a continuous process for the manufacture of preformed plaster articles. It might have been thought that to attain such short setting times the amount of accelerator would have to be increased, but this is not the case and the result is that mixes containing relatively little accelerator, which are consequently cheaper and also preferable in other ways, may be used.

The sets obtained from the putty- or dough-like mixes described above have excellent tensile strength and hardness, as is evident from the following tables:—

Table 2

(Material used:—Anhydrite ground so that 80 per cent. passes a 180-mesh sieve, mixed with 1.6 per cent. of mixed accelerant salts.)

| Percentage of water used, calculated on weight of dry powder | Mean tensile breaking load in pounds per square inch | |
|---|---|---|
| | At 2 days | At 10 days |
| 15 | 304 | 601 |
| 17.5 | 276 | 517 |
| 20 | 221 | 476 |
| 22.5 | 193 | 482 (12 days) |
| 25 | 143 | 426 (11 days) |
| 27.5 | 136 | 377 |
| 30 | 97 | 322 |

Table 3

(Material used:—Anhydrite ground so that 80 per cent. passes a 180-mesh sieve, mixed with 1.6 per cent. of mixed accelerant salts.)

| Percentage of water used, calculated on weight of dry powder | Hardness of set | | | |
|---|---|---|---|---|
| | 1 day | 2 days | 8 days | 12 days |
| 15 | 17.1 | 19.5 | 20.8 | 24.0 |
| 17.5 | 17.1 | 19.1 | 20.8 | 20.5 |
| 20 | 15.1 | 16.8 | 17.8 | 18.2 |
| 22.5 | 12.1 | 14.7 | 17.1 | 17.5 |
| 25 | 12.1 | 12.9 | 15.5 | 16.9 |
| 27.5 | 10.2 | 11.5 | 12.7 | 13.6 |
| 30 | 7.8 | 9.7 | 12.7 | 12.9 |

According to my invention, therefore, I prepare a plastic putty- or dough-like mass by mixing a plaster of the accelerated anhydrite type with about 15 to 20 per cent. by weight of water, with or without pigments and/or fillers such as cork, wood fibre, or pumice, and I form the mass into slabs, sheets, or other shapes by rolling, pressing, extruding or similar mechanical means. The plaster employed is preferably mineral anhydrite ground so that at least 80 per cent. passes a 180-mesh sieve, together with a small amount of one or more suitable accelerators, or mixtures of such plaster with subordinate amounts, e. g. up to 10 to 15 per cent., of plaster of Paris and/or Portland cement and/or hydrated lime, insofar as these ingredients are compatible with the mix. Plaster mixes giving cellular products including bubble-like voids may also be used.

In the manufacture of plaster board the plastic mass may be fed under a roller on to a horizontal travelling band of say $\frac{1}{32}$ inch pulp board or similar fibre board, whereby, owing to the relatively stiff nature of the plastic a layer of uniform thickness, e. g. ¼ inch to 1 inch, is obtained which does not require lateral support and which gradually hardens to a set mass as the band travels along. If desired, a top layer of pulp board may be applied to the plaster layer by feeding a layer of board immediately under the roller, the plastic being fed into the gap between the upper and lower layers of pulp board. It is also possible to apply a further layer of plaster over the top layer of pulp board by means of another roller. In this case the top layer of pulp board is preferably perforated, so as to provide exposed patches of plaster as a key for the final plaster layer.

The final layer of plaster may be given a polished surface by feeding a polished strip of celluloid or thin metal on to the top plaster layer so that while this layer is setting the surface is in contact with a hard polished surface. After setting has taken place, the strip of celluloid or thin metal is removed from the surface which is left in a polished condition. The polished plaster layer may be formed from a coloured or mottled mix, while the internal plaster layer may be plain. Fillers may be used in either or both layers.

Where a plaster slab or board of especially high strength is required, the plaster may be reinforced internally, e. g. by feeding a sheet of wire gauze, or hollow metal or pulp board tubes, or a perforated pulp board or metal sheet into the mass. The pulp board facings may be also reinforced by means of wires, metal gauze, perforated metal, or other suitable means. They may also be waterproofed, e. g. by impregnating them with an aqueous emulsion of bitumen, before or after application of the plaster.

A corrugated or ribbed plaster board may also be made by feeding the plastic on to a sheet of pulp or fibre board which is bent into a series of corrugations and placed on a correspondingly shaped base. The plastic is applied so as to fill the channels and to form a continuous layer over the same, and a further layer of board is preferably applied over the top surface.

It should be pointed out that the plaster slabs, sheets and board made by the continuous process described above may be cut into pieces of the required size immediately after formation of the shape has taken place, since the plastic is sufficiently stiff to retain its shape although it has not yet set. This enables a compact plant to be used, as distinct from the manufacture of plaster of Paris board, where the material has to set before it can be cut, thus necessitating a long travelling band. The freshly cut slabs may also be handled and stacked without detriment.

The plaster slabs, sheets and board made according to the invention also need little or no drying, as the amount of water used in making the mix is very little more than is needed for the setting reaction. Plaster of Paris board, on the other hand, needs special drying as a large excess of water is used in the first instance, e. g. about 80 per cent. calculated on the dry powder, and it is not feasible to reduce this amount in the case of plaster of Paris since the setting of the mass would occur too quickly to allow time for the necessary operations of mixing and feeding. Even if retarders were added to lengthen the time of set, 40 to 50 per cent. of water would be required to wet plaster of Paris and to bring it to the state of a putty- or dough-like mass and it would still set sharply at a certain point, as distinct from the gradual set of plasters of the accelerated anhydrite type. The excess of water used in the manufacture of plaster of Paris board also makes it practically impossible to use pre-decorated pulp board facings, as the water would injure the decoration. Such decorated board can be used without any drawbacks in the method of the present invention.

The plaster board made according to the invention also has marked advantages over plaster of Paris board in regard to strength and low degree of water absorption.

The plaster board may be used for floorings in the form of rectangular sheets of comparatively large size, e. g. 8 feet by 4 feet, or in the accepted sizes of flooring timber. Sheets of the required size may be obtained by cutting the plaster board while the plaster is still in the plastic state as described above. Alternatively the board may be cut by means of a saw after the plaster has set.

The board may be fixed to joists or other constructional framework by nails, screws, pegs or the like, which may be driven through the board or which may be inserted through previously formed holes in the board.

If desired, the board may be strengthened at the edges by fitting thin steel channel members over the same, the edges of the steel being preferably slightly turned in and embedded in the surface of the board. The steel channel members may be tongued and grooved alternately so as to permit a very strong and rigid flooring to be obtained.

I claim:—

1. A process for the manufacture of preformed plaster slabs, sheets and other articles which comprises thoroughly mixing a dry plaster comprising mineral anhydrite and an accelerator therefor with about 15 to 20 per cent of water into a stiff, plastic, doughy mass, forming the mass into the desired shape and allowing it to set.

2. A process as set forth in claim 1, in which the plaster consists essentially of mineral anhydrite ground so that at least 80 per cent. passes a 180-mesh sieve, together with a small amount of accelerator.

3. A process as set forth in claim 1, in which inert materials are also included in the mix, said inert materials being selected from the class consisting of pigments and fillers of the kind typified by cork, wood fibre and pumice.

4. A process for the manufacture of plaster board, which comprises preparing a plaster mix comprising mineral anhydrite and an accelerator therefor admixed with about 15 to 20 per cent of water, said mix being of dough-like consistency, spreading said mix with a uniform upper surface on a travelling band of fibre board, and pressing a sheet of fibre board on to said upper surface so as to cause an effective bond between the plaster and the fibre boards.

5. A process as set forth in claim 4, in which the upper fibre board is perforated so as to expose patches of plaster, and a further layer of plaster is spread over the perforated board.

6. A process for the manufacture of plaster board which comprises thoroughly mixing a dry plaster comprising mineral anhydrite and an accelerator therefor with about 15 to 20 per cent of water into a stiff, plastic, doughy mass, spreading the mass on fiber board and leveling the surface of the spread mass.

7. A process as set forth in claim 6, in which a second sheet of fibre board is pressed on to the upper surface of the spread mix.

8. A process as set forth in claim 6, in which the plaster consists essentially of mineral anhydrite ground so that at least 80 per cent. passes a 180-mesh sieve, together with a small amount of accelerator.

9. A process as set forth in claim 6, in which inert materials are also included in the mix, said inert materials being selected from the class consisting of pigments and fillers of the kind typified by cork, wood fibre and pumice.

VICTOR LEFEBURE.